July 27, 1965

E. R. POWELL 3,197,295

METHOD FOR FORMING SILICEOUS FIBERS

Filed Sept. 27, 1960

INVENTOR.
EDWARD R. POWELL

BY John A. McKinney

ATTORNEY

July 27, 1965   E. R. POWELL   3,197,295
METHOD FOR FORMING SILICEOUS FIBERS
Filed Sept. 27, 1960   2 Sheets-Sheet 2

INVENTOR.
EDWARD R. POWELL
BY
*John A. McKinney*
ATTORNEY 3,197,295
METHOD FOR FORMING SILICEOUS FIBERS
Edward R. Powell, North Plainfield, N.J., assignor to Johns-Manville Corporation, New York, N.Y., a corporation of New York
Filed Sept. 27, 1960, Ser. No. 58,796
4 Claims. (Cl. 65—5)

The present invention relates generally to the production of siliceous fibers, and more particularly to an improved method and apparatus for forming glass fibers.

One method of forming mineral wool fibers has been to direct a molten stream of slag from a cupola, in which the raw materials are melted, into a highly turbulent area created by the action of a steam or air jet delivering a high velocity stream of fluid which sheds the stream of molten material into a plurality of fine fibers. Although this process is well suited for the forming of mineral wool fibers in large volume, it has not been satisfactory as a method of forming glass fibers since the viscosity of a molten stream of glass, at a comparable temperature, is considerably higher than that of a stream of slag and thus the stream does not separate into fibers having a small enough diameter to form the glass fiber products in greatest demand.

Various methods have been tried in an attempt to solve the problem of attenuating a molten stream of glass into fine diameter fibers in sufficient quantity so that the fibers would be commercially competitive on a cost basis with those formed by the conventional glass fiber forming processes. None of these attempts has been entirely successful since the largest demand for glass fibers resides in products formed of fibers having diameters not greater than about 3½ to 4 microns. Prior methods of fiberizing a molten stream of glass have only been able to produce fibers having diameters greater than about 15 microns in large enough quantities so that products formed therefrom can be competitively priced.

In accordance with the method of the present invention, the above problems have been solved by subdividing portions of a molten stream of glass by applying a tractive force to a surface of the stream of glass to move a surface segment thereof laterally with respect to the main body of the stream, separating the laterally moved segment into fiber-like streams, and then further fiberizing the streams by directing a high velocity gaseous blast into contact therewith.

It is, therefore, an important object of the present invention to provide an improved method and apparatus for forming siliceous fibers.

Another object of the invention is to provide an improved method and apparatus for forming fine diameter glass fibers.

Another object of the invention is to provide a method and apparatus for forming glass fibers at rates in excess of the processes commonly used.

A further object of the invention is to provide an improved method and apparatus for forming fibers from a molten stream of siliceous material capable of being formed into fibers.

The invention will be more fully understood and further objects and advantages thereof will become more apparent when reference is made to the following detailed description of a preferred embodiment of the invention and the accompanying drawings in which.

Figure 1:
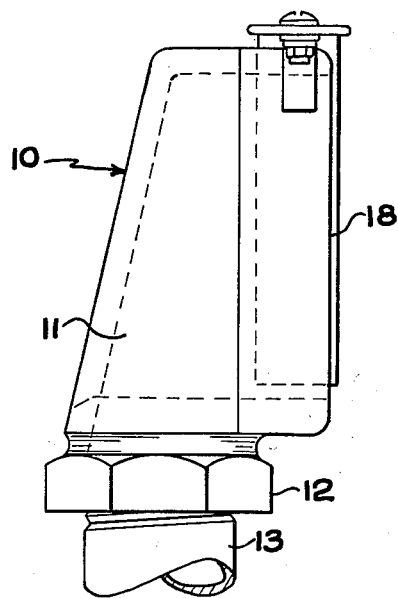
FIG. 1 is a side elevation view of apparatus constructed in accordance with the invention.
Figure 2:
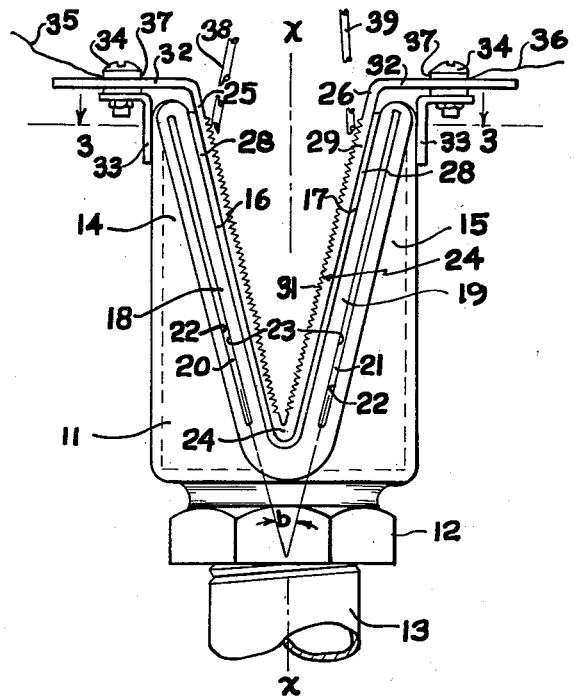
FIG. 2 is a front elevation view of the apparatus of FIG. 1.

According to the method of the present invention, a layer of molten fiber forming material is flowed along a path having a side edge thereof defined by a wall having a plurality of openings therein through which the molten glass may be drawn in the form of molten or semi-molten discrete streams. The streams are formed by passing a high velocity fluid stream transversely across the path of the glass immediately adjacent the surface thereof whereby a tractive force is applied to the surface of the molten layer to extrude or draw fibrous streams thereof away from the layer in the direction of the fluid stream. If desired, the fibrous streams may be formed into finer fibers by engaging the streams with a high velocity gaseous blast.

With reference now to the drawings, there is shown apparatus suitable for carrying out the method of the invention which comprises a generally V shaped nozzle 10. The nozzle 10 comprises a hollow body portion 11 preferably formed as a single casting and including a lower flange portion 12 which is provided with an interior thread for receiving a pipe 13 forming an outlet for a suitable source of pressurized fluid, such as steam or compressed air. The upper portion of the body 11 defines a pair of upstanding hollow wings 14 and 15 having adjacent substantially flat inner walls 16 and 17, respectively, each of which diverges upwardly to form, in combination, a substantially V shape. The front of the nozzle 10 is defined by face walls 18 and 19, joined to the inner walls 16 and 17, which face walls are substantially flat and lie in the same vertical plane. The face walls 18 and 19, have elongated upwardly diverging discharge slots 20 and 21, respectively, formed therein and communicating with the hollow interior of the nozzle. Each of the slots has substantially parallel side walls 22 and 23 which are oriented with respect to the vertical axis X—X of the nozzle so that the pressurized fluid stream issuing therefrom will converge at an included angle $a$ of about 7°. With a 7° included angle $a$, a satisfactory included angle $b$ of vertical slot divergence would be about 26°.

Figure 4:
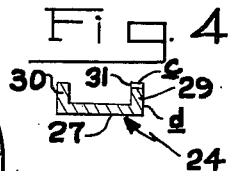
FIG. 4 is a fragmentary view taken along line 4—4 of FIG. 3.

Positioned along the front edge of each of the diverging inner walls 16 and 17 there is provided a substantially V shaped open trough 24 having upwardly diverging leg portions 25 and 26, each of which, as shown in FIG. 4, is substantially U shaped in cross section and provided with a bottom wall 27 substantially parallel to the walls 16 and 17 and to the longitudinal axes of the mouths of the adjacent discharge slots 20 and 21. The bottom wall 27 is spaced from the walls 16 and 17 by a layer 28 of suitable insulation, such as asbestos. As shown in FIG. 4, the trough 24 includes outwardly extending front and rear side walls 29 and 30. The front side wall 29 has its upper edge $c$ substantially parallel to the longitudinal axes of the mouths of the slots 20 and 21 and is serrated to provide a multiplicity of openings or orifices 31, each of which is preferably of identical size. Preferably, the trough 24 is positioned so that the wall 29 has its front surface $d$ located forwardly of the face walls 18 and 19 containing the discharge slots 20 and 21.

The uppermost ends of the trough sections 25 and 26 terminate as outwardly directed flange portions 32 supported by suitable brackets 33 mounted upon the wings 14 and 15 and provided with suitable openings corresponding with openings formed in the flange portions through which bolts 34 may be inserted to clamp the trough to the brackets. As will be brought out later, it is desirable that the trough be heated and thus it is preferably formed of a suitable high temperature-resistant material such as platinum, or platinum rhodium alloy, so that the trough may be resistance heated by passing a current through electrical leads 35 and 36. The leads may be connected by providing suitable insulating spacers 37 in contact with opposed surfaces of the flanges 32 and clamping the leads between a spacer and the flange 32.

Figure 3:
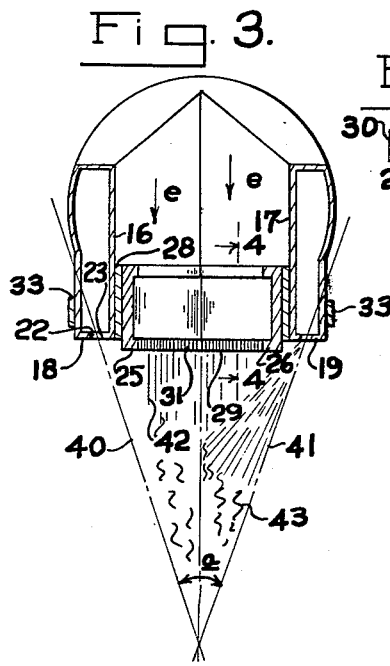
FIG. 3 is a transverse sectional view taken along line 3—3 of FIG. 2.

In operation, a pair of molten glass streams or columns 38 and 39 are flowed downwardly from a suitable source, such as a glass melting furnace, and contact the bottom wall of the uppermost ends of the trough sections 25 and 26 and flow downwardly along the bottom wall thereof as thin elongated converging streams advancing endwise along their length and confined to a fixed path defined by the trough. High pressure fluid, such as steam or compressed air, is passed into the nozzle and emitted through each of the converging slots 20 and 21 to form, as shown in FIG. 3, an outwardly extending pair of converging gaseous blasts 40 and 41 which intersect one another along a line spaced forwardly from the nozzle. Due to the high velocity of each blast, a strong flow of induced air, indicated by the arrows e, is created and flows forwardly between the wings 14 and 15 of the nozzle and passes transversely across the trough sections 25 and 26 at substantially a right angle thereto and applies a tractive force, or drag, to a surface segment or layer of the molten glass within the trough thus urging surface portions of the glass within the trough toward the orifices 31 in the side wall 29 thereof which subdivide the surface portions into semi-molten streams or filaments 42 which initially leave each trough section in a common plane and are substantially parallel to one another. Due to the high velocity of the gaseous blasts 40 and 41, a partial vacuum is formed or applied immediately adjacent the front side wall 29 of the trough sections, beneath the orifices 31, which aids the induced air in drawing or extruding the molten glass through the orifices. After being formed, the streams 42 are drawn or projected forwardly toward the converging blasts emitted through the slots 20 and 21 by the continuous effect of the induced air in applying tractive force thereto and are attenuated by the blasts into a multiplicity of fine fibers 43.

The quantity and diameter of the fibers produced depend to a large degree upon the temperature of the molten or semi-molten glass in the streams 42 issuing from the trough orifices. Generally speaking, the higher the temperature of the streams, the finer and more numerous the attenuated fibers. Therefore, while flowing within the trough, the molten glass is heated by resistance heating the trough so that the temperature drop of the molten stream flowing therein is maintained at a minimum. Normally, the columns of molten glass 38 and 39 contact the trough sections at a temperature in the order of about 2000° F. to 2600° F. Due to the cooling effect of the induced air stream, the glass rapidly loses temperature and may have a temperature drop of some 700° F. to 800° F. before it issues from the orifices 31 as streams. To aid in cutting down heat loss, it is preferable that the length to width ratio of the trough sections 25 and 26 is at least 3:1 and preferably is between about 4:1 to 20:1. The temperature drop is also maintained at a minimum by resistance heating the trough and thus heating the molten glass therein so that loss of heat occurs only from the uppermost exposed surface of the glass within the trough. Preferably the trough is heated to a temperature such that all portions of the front side wall 29 surrounding the orifices 31 are maintained at a temperature at least equal to the temperature of the molten glass as it passes through the orifices.

Fine diameter fibers have been produced by supplying steam to the nozzle at a pressure, temperature and volume sufficient that the velocity of the blast issuing through the converging slots is at least 500 feet per second and preferably is at least supersonic and in the order of about 1,000 to 1,800 feet per second or greater and has a temperature of between 800° F. to 1900° F. It will be apparent, however, that the temperature and velocity of the blast may be varied depending upon the desired diameter of the final fibers. In any event, it is desirable that the blast velocity be such as to create an induced air flow of at least 100 feet per second and preferably over 300 feet per second.

Figure 5:
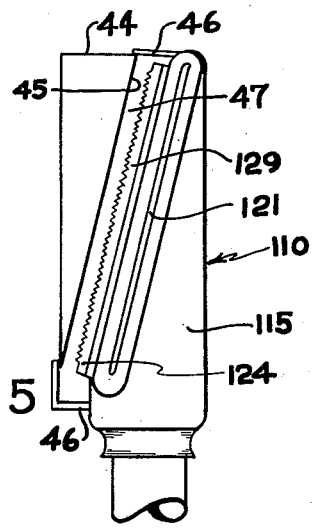
FIG. 5 is a front elevation view of a modified form of the apparatus.
Figure 6:
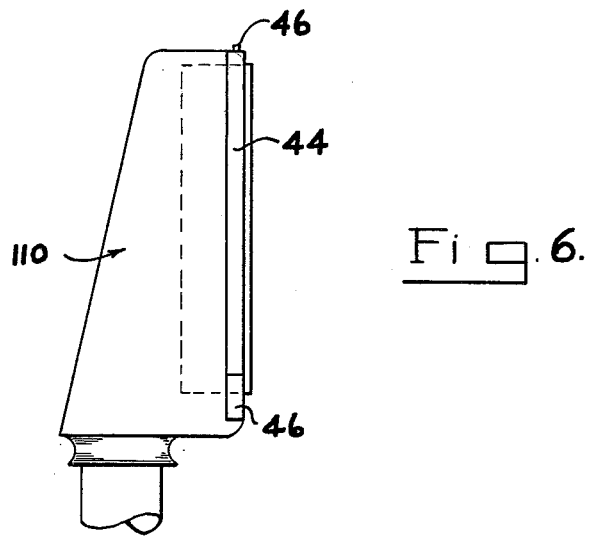
FIG. 6 is a side elevation of the apparatus shown in FIG. 5.
Figure 7:
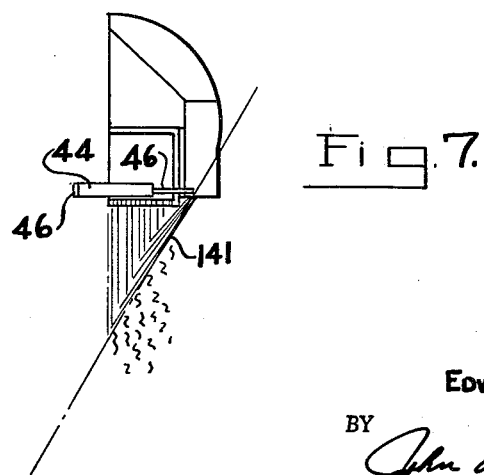
FIG. 7 is a plan view of the apparatus shown in FIG. 6.

Although the preferred embodiment of the apparatus comprises a V shaped nozzle, it will be understood that either wing of the nozzle is operative to form fibers in accordance with the method of the invention. For example, a half nozzle 110 as shown in FIG. 5 may be used. The construction of the nozzle 110 is in all respects identical with that of FIGS. 1 to 4 except for having only one wing 115. An upstanding plate 44 is positioned above the nozzle and has an edge 45 thereof spaced upwardly and laterally from the forward side wall 129 of the trough 124 and is mounted in position by means of webs 46 secured to the wing 115. The plate 44 may be of the same thickness as the side wall 129 and preferably is disposed in the same plane. In operation, the gaseous blast 141 emitted from the slot 121 causes a flow of secondary or induced air through the elongated space 47 between the trough 124 and the edge 45 of the plate 44 to perform the same function as the induced air stream of the nozzle of FIGS. 1 to 4.

From the foregoing description of the invention, it will be readily understood that fibers of varying size may be readily produced by merely controlling the temperature of the streams of material issuing from the orifices. In the specification and claims, the term "streams" is used to define the condition of the material leaving the orifices. It will be understood that the viscosity of this material will depend upon the temperature of the molten glass within the trough 24 and, depending upon this temperature, the streams may leave the orifices in molten form or semi-molten form. In either case, the tractive or drawing force applied to the streams by the induced air causes a necking down or attenuating thereof prior to the additional attenuation of fiberizing caused by engagement.

It will also be understood that by not directing the gaseous blast toward one another in converging relationship, relatively coarse fibers may be formed since the streams or filaments 42 themselves are fibrous in form; but, of course, of relatively large diameter. Thus the method of the invention may be used to form relatively large, coarse fibers or finer fibers depending upon whether or not fibrous streams issuing from the orifices are subsequently engaged by the attenuating blasts.

In summarizing the method of the invention, an elongated body or stream of molten siliceous fiber forming material is flowed endwise along its length. A portion of the periphery of the body is confined by the trough 24 and preferably has heat applied thereto by resistance heating the trough. The remaining exposed peripheral surface portion of the flowing body is not heated and has a tractive force applied thereto by the induced air flow in a direction transverse to the flow of the body and exposed surface portion to move the exposed surface segment of the body laterally or transversely to the direction of flow of the body. Spaced apart portions of the surface segment having tractive force applied thereto are restricted from further lateral movement by the portion of the trough side wall 29 between the orifices 31 so that the remaining portions of the surface segments, in line with the orifices, have the tractive force continuously applied thereto to draw such portions transversely away from the downwardly flowing body of molten material. Since the orifices are preferably of equal size and centered on a straight line, the streams of material drawn from a single trough section lie substantially in a common plane and are substantially parallel to one another. Because the molten glass within the trough has an exposed surface portion thereof at an elevation above the bottoms of the orifices 31, a partial vacuum created by the high velocity blast issuing from the nozzle slots 20 and 21 results in atmospheric pressure being operative to, in effect, press or extrude the molten material through the orifices due to the partial vacuum created adjacent the front wall 29 of the trough and in an area extending beneath the bottoms of the orifices. Depending upon the size of the fibers ultimately required, the drawnout streams may be engaged by a high velocity gaseous blast issuing from the nozzle slots and attenuated into finer diameter fibers.

While the invention has been described in rather full details, it will be understood that these details need not be strictly adhered to and that various changes and modifications may suggest themselves to one skilled in the art, all falling within the scope of the invention as defined by the sub-joined claims.

I claim:
1. A method of forming siliceous fibers, comprising flowing a pair of molten streams of fiber forming material along converging downwardly inclined opposed paths; and inducing a flow of ambient air transverse to the flow of said molten streams by applying a pair of converging hot gaseous blasts, adjacent to and forwardly of said streams, whereby a tractive force is applied to and attenuates said fiber forming material.

2. A method of forming siliceous fibers, comprising flowing molten fiber forming material into an open trough to form a molten body, and inducing a transverse flow of ambient air over the surface of said molten body by projecting a hot gaseous blast adjacent to and forwardly of said molten body, whereby a tractive force is applied to and attenuates said fiber forming material.

3. The method as described in claim 2 wherein the molten fiber forming material is of a V-shaped pattern when the tractive force is applied.

4. A method of forming siliceous fibers, comprising: flowing a source of molten siliceous fiber forming material to form a molten body; inducing a flow of ambient air transverse to and over said body by projecting a gaseous blast forwardly of said body, whereby a tractive force is applied by the induced ambient air to said body and a portion of said molten material is withdrawn from said body and attenuated.

References Cited by the Examiner
UNITED STATES PATENTS

| | | | |
|---|---|---|---|
| 1,977,406 | 10/34 | Powell | 239—590 |
| 2,136,158 | 11/38 | Thomas | 65—16 XR |
| 2,151,090 | 3/39 | Drill | 239—597 |
| 2,156,316 | 5/39 | Slayter et al. | 65—9 XR |
| 2,544,486 | 5/51 | Austin | 128—446 |
| 2,578,707 | 12/51 | Kocher | 65—16 XR |
| 2,603,833 | 7/52 | Stalego et al. | 65—14 XR |
| 2,609,566 | 9/52 | Slayter | 65—14 XR |
| 2,663,903 | 12/53 | Stalego | 65—16 XR |
| 2,810,158 | 10/57 | Smout | 65—16 XR |
| 2,814,832 | 12/57 | Stephens | 65—16 XR |
| 3,014,236 | 12/61 | Snow | 65—9 XR |
| 3,015,127 | 1/62 | Stalego | 65—16 XR |

DONALL H. SYLVESTER, *Primary Examiner.*
MICHAEL V. BRINDISI, MORRIS O. WOLK,
*Examiners.*